J. DA C. GADELHA.
LATEX HACK.
APPLICATION FILED JAN. 3, 1912.
1,047,753.
Patented Dec. 17, 1912.
2 SHEETS—SHEET 1.
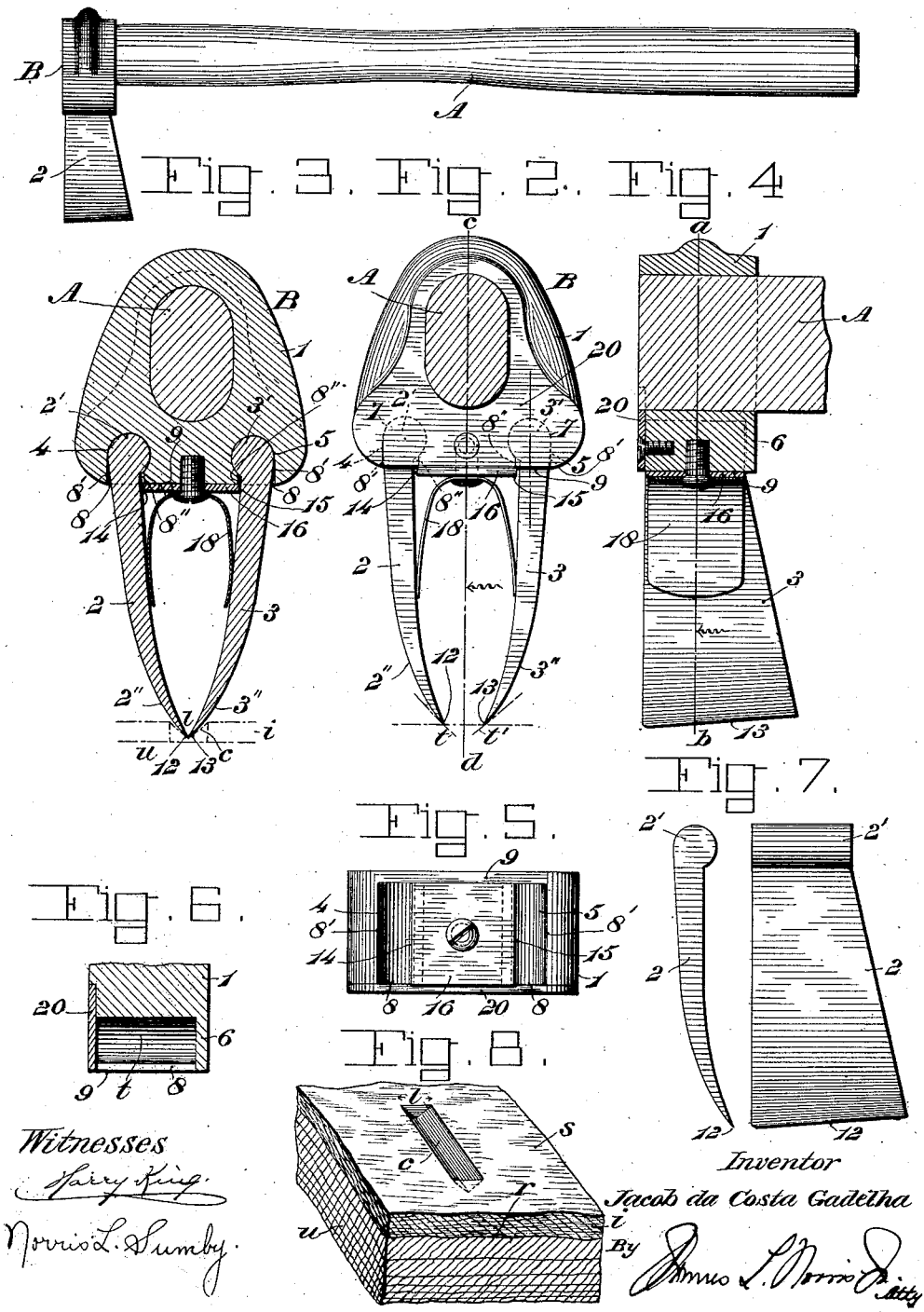
Witnesses
Inventor
Jacob da Costa Gadelha
By 
Atty J. DA C. GADELHA.
LATEX HACK.
APPLICATION FILED JAN. 3, 1912.
1,047,753.
Patented Dec. 17, 1912.
2 SHEETS—SHEET 2.
Fig. 9.
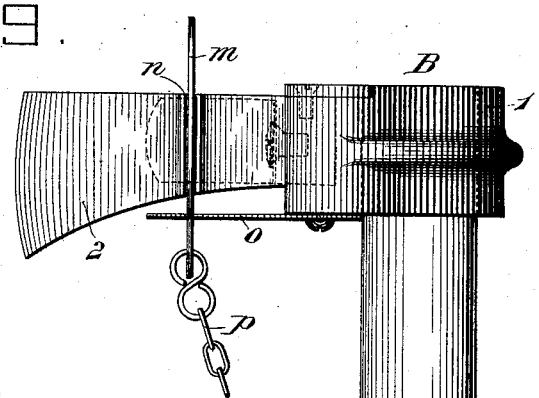
Fig. 10.
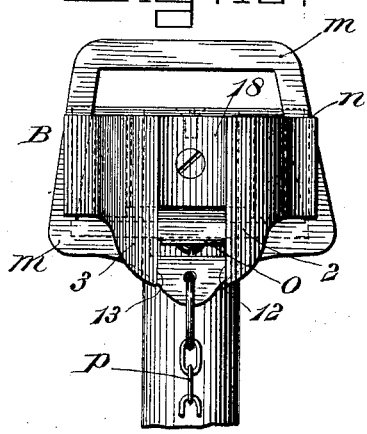
Fig. 11.
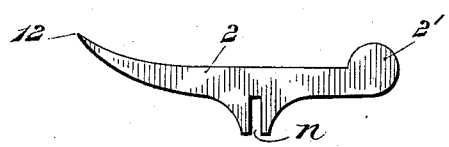
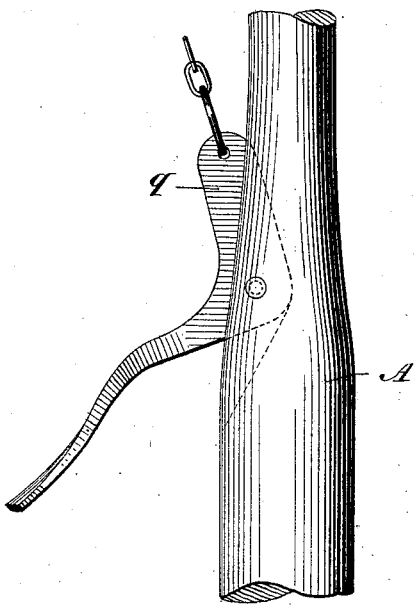
Witnesses
Harry King
Norris L. Sumby
Inventor
Jacob da Costa Gadelha
By
James L. Norris
Atty

UNITED STATES PATENT OFFICE.

JACOB DA COSTA GADELHA, OF NOVA VISTA, COMARCA DE LABREA, BRAZIL.

LATEX-HACK.

1,047,753.  Specification of Letters Patent.  Patented Dec. 17, 1912.

Application filed January 3, 1912. Serial No. 669,162.

*To all whom it may concern:*

Be it known that I, JACOB DA COSTA GADELHA, a citizen of the Republic of the United States of Brazil, residing at Nova Vista, Comarca de Labrea, State of Amazonas, Republic of Brazil, have invented certain new and useful Improvements in Latex-Hacks, of which the following is a specification.

The present invention has reference to latex hacks, and it comprehends, briefly, a hatchet-shaped implement of the type specified which is constructed in such a manner as to permit incisions to be made, even by unskilled hands, in the bark of lactiferous trees without fear of injuring the wood of the trees. This result is obtained by providing the head of the implement with a pair of blades which are loosely connected thereto at their inner ends, so as to enable them to swing toward and from each other, and which are normally held a certain distance apart.

When the implement is struck against a tree, the sharpened free ends of both blades enter the bark and, by reason of their shape, are caused to approach each other until they meet, or nearly meet, therein at a predetermined distance from the outer surface of the bark, from which latter, when withdrawn, they will remove a section cut by the converging incisions. A wound is thus formed in the bark which has the shape of a dihedral angle, the apex of the angle being located close to the inner surface of the bark, so that no injury is done to the wood of the tree.

An embodiment of the invention is illustrated in the accompanying drawings, wherein—

Figure 1 is a side elevation of the complete implement; Fig. 2 is an enlarged front elevation of the head of said implement, showing the blades in normal position; Fig. 3 is a sectional view taken on the line *a—b* of Fig. 4, showing the blades in operated position; Fig. 4 is a sectional view taken on the line *c—d* of Fig. 2; Fig. 5 is a bottom plan view of the head, the blades being omitted; Fig. 6 is a fragmental sectional view of the head, showing one of the sockets formed therein; Fig. 7 is a combined side and front elevation of one of the blades; Fig. 8 is a perspective view of a section of a lactiferous tree, showing the wound produced therein by the implement; Figs. 9 and 10 are side and front elevations, respectively, of a modified form of the invention; and Fig. 11 is a plan view of one of the blades employed in the modified form.

As shown in said drawings, the implement consists, essentially, of a handle A, which may be of any suitable type, and a working part or head B, the latter part presenting the most important feature of the invention. The aforesaid working part B comprises a block or head proper 1, provided with the usual eye wherein the handle end is received, and a pair of similar blades 2 and 3. The block 1 is formed with a pair of sockets 4 and 5 which, as shown, open through the front face thereof, but terminate short of the rear face 6; the major or inner portions 7 of these sockets are cylindrical, and they communicate and lead outwardly through openings 8 in the bottom face 9 of the block. Blades 2 and 3 terminate at their respective inner ends in cylindrical enlargements 2' and 3' that fit loosely in the socket portions 7 and are held therein by a plate 20 secured to the front face of block 1, while their outer ends 2'' and 3'' are sharpened to produce cutting edges, as indicated by the numerals 12 and 13, the latter ends being curved inwardly toward each other.

To provide for an oscillatory movement of the blades in their sockets, the distance between the edges 8' and 8'' of the openings 8 is made somewhat greater than the thickness of the blades at the junction points between the blade bodies or shanks and the enlargements 2', 3'. It is intended, however, to limit the swinging movement of the blades in both directions, and to this end suitable stop devices of various kinds may be employed. In the construction represented in detail in Fig. 3, the stops for limiting the outward movement of the blades are constituted by the outer edges 8' of the openings 8. To limit the inward movement of said blades, there is shown a plate 16 which is fastened to the portion of the bottom face of block 1 between said openings; the edges 14 and 15 of this plate form the stops, but it will be obvious that said plate may be omitted and the inner edges 8'' of the openings 8 be utilized as the stops, detail illustration of the latter feature being considered unnecessary. Specially constructed stops may be substituted for the stop edges 8', if desired, an example of such stops being shown in Figs. 9 and 10, wherein the stops are constituted by a pair of members disposed transversely of the blades and connected together, at their corresponding ends, so that the resultant structure m has substantially the shape of a yoke. These members, which thus constitute the legs of the yoke, are inclined in opposite directions and are slidably engaged in guides n provided upon the blades, in order to enable the yoke to be shifted endwise, the yoke being normally forced upward by a spring o attached to block 1 and being depressed against the action of the spring by means of a bellcrank lever q pivoted to handle A and connected by a chain p, or the like, with said yoke.

The blades are normally held at the limit of their outward movement, with their cutting edges separated, by a spring 18, here shown as secured to plate 16 by the screw, or the like, used to attach that plate to block 1, the distance between said edges being equal to the breadth l of the wound c, to be made in the bark i of the tree. Consequently, when the yoke m is made use of, the breadth of the wound may be regulated by shifting the yoke in the proper direction, this being effected by the pressure of the fingers of the operator upon the lower arm of the lever q.

The ends of the curved outer surfaces of the blades are so constructed that the tangents t and t' to these curves form an angle with the outer surface s of the bark i, (see Figs. 3 and 8), when the cutting edges come in contact with that surface. As a result, said edges, when penetrating surface s, move toward each other until they finally come together at or close to the outer surface r of the body u of the tree, at which point the wedge thus formed is stopped by resistance offered by the bark. When the implement is subsequently withdrawn, the wound inflicted in the bark will be found to have the shape of a dihedral angle, the length, breadth and depth of which are dependent upon the length of the cutting edges of the blades, the normal distance between said edges, and the angle formed by the tangents t and t'.

I claim as my invention:

1. In a latex hack, the combination, with a handle; of a head attached to said handle and comprising a block formed with a pair of sockets, and a pair of similar coacting cutting blades having their inner ends fitted loosely in said sockets, to permit said blades to swing toward and from each other, said head being provided with stops for limiting the movements of the blades toward and from each other.

2. In a latex hack, the combination, with a handle; of a head attached to said handle and comprising a block formed with a pair of sockets, a pair of similar coacting cutting blades having their inner ends loosely fitted in said sockets to permit said blades to swing toward and from each other, and means for normally holding the outer ends of the blades separated, said outer ends being curved inwardly toward each other whereby they are caused to approach each other in the bark of the tree against which the hack is struck, and said head being provided with stops for limiting the movements of said blades in both directions.

3. In a latex hack, the combination, with a handle; of a head attached to said handle and comprising a block formed with a pair of sockets which open through the bottom face thereof, a pair of similar coacting cutting blades having their inner ends fitted loosely in said sockets, to permit said blades to swing toward and from each other, the outer edges of said sockets constituting stops for limiting the movement of said blades away from each other, means for normally holding said blades against said stops, and a plate secured to the said bottom face of said block between said sockets, the opposite side edges of said plate constituting stops for limiting the movement of said blades toward each other.

4. In a latex hack, the combination, with a handle, of a head attached to said handle and comprising a block formed with a pair of cylindrical sockets which open through the bottom face thereof, a pair of similar coacting blades provided at their inner ends with cylindrical enlargements loosely fitted in said sockets, to permit said blades to swing toward and from each other, a plate secured to the said bottom face of said block between said sockets, the opposite side edges of said plate constituting stops for limiting the movement of said blades toward each other, and the outer edges of said sockets constituting stops for limiting the movement of said blades away from each other, and a spring secured to said plate and bearing against said blades for normally holding the latter against the second-named stops, the outer ends of said blades being curved inwardly toward each other whereby they are caused to approach each other in the bark of the tree against which the hack is struck.

In testimony whereof I have hereunto set my hand in presence of two subscribing witnesses.

JACOB DA COSTA GADELHA.

Witnesses:
MAX F. A. KAEMPFF,
HENRIQUE A. A. ARENS.